(12) United States Patent
Wang et al.

(10) Patent No.: US 12,191,765 B2
(45) Date of Patent: Jan. 7, 2025

(54) POSITIVE-AND-NEGATIVE-VOLTAGE CHARGE PUMP CIRCUIT, CHIP AND COMMUNICATION TERMINAL

(71) Applicant: SHANGHAI VANCHIP TECHNOLOGIES CO., LTD., Shanghai (CN)

(72) Inventors: Yongshou Wang, Shanghai (CN); Cheng Chen, Shanghai (CN); Chunling Li, Shanghai (CN); Sheng Lin, Shanghai (CN)

(73) Assignee: SHANGHAI VANCHIP TECHNOLOGIES CO., LTD., Shanghai (CN)

( * ) Notice: Subject to any disclaimer, the term of this patent is extended or adjusted under 35 U.S.C. 154(b) by 42 days.

(21) Appl. No.: 18/318,026

(22) Filed: May 16, 2023

(65) Prior Publication Data
US 2023/0291309 A1 Sep. 14, 2023

Related U.S. Application Data

(63) Continuation of application No. PCT/CN2021/130586, filed on Nov. 15, 2021.

(51) Int. Cl.
*H02M 3/07* (2006.01)

(52) U.S. Cl.
CPC ............ *H02M 3/07* (2013.01); *H02M 3/071* (2021.05)

(58) Field of Classification Search
CPC .................................................. H02M 3/071

USPC ....................... 327/536; 363/58–61; 307/110
See application file for complete search history.

(56) References Cited

U.S. PATENT DOCUMENTS

| | | | | |
|---|---|---|---|---|
| 5,463,542 A * | 10/1995 | Okamoto | ............... | H02M 3/07 363/60 |
| 5,682,118 A * | 10/1997 | Kaenel | ..................... | G05F 3/24 327/530 |
| 7,583,131 B2 * | 9/2009 | Kimura | .................. | H02M 3/07 327/536 |
| 7,911,261 B1 * | 3/2011 | Shamarao | ................ | G05F 3/08 327/535 |

(Continued)

*Primary Examiner* — Thomas J. Hiltunen
(74) *Attorney, Agent, or Firm* — George Guosheng Wang; Upstream Research and Patent LLC

(57) ABSTRACT

A positive-and-negative-voltage charge pump circuit, comprising a clock generation module, a positive-voltage charge pump module, a transient enhancement module, and a negative-voltage charge pump module. The positive-voltage charge pump module generates a positive voltage according to a clock signal output by the clock generation module, and the transient enhancement module is used to sample the positive voltage and a power supply voltage, and convert same into currents for comparison, such that the negative-voltage charge pump module provides a switchable input voltage according to a comparison result. The negative-voltage charge pump module can quickly and reliably establish a negative voltage according to a clock signal output by the clock generation module, thereby improving the speed and efficiency of the negative-voltage charge pump module generating the negative voltage. Further disclosed are an integrated circuit chip, which comprises the positive-and-negative-voltage charge pump circuit, and a communication terminal.

15 Claims, 4 Drawing Sheets

(56) References Cited

U.S. PATENT DOCUMENTS

| | | | | |
|---|---|---|---|---|
| 8,164,379 B2* | 4/2012 | Chuang | ............... | H02M 3/07 |
| | | | | 327/536 |
| 8,212,607 B2* | 7/2012 | Kwon | ............... | H02M 3/07 |
| | | | | 327/536 |
| 8,289,071 B2* | 10/2012 | Miyazaki | ............... | H02M 3/07 |
| | | | | 327/536 |
| 8,493,133 B2* | 7/2013 | Byeon | ............... | G05F 1/575 |
| | | | | 327/536 |
| 2006/0132417 A1* | 6/2006 | Shigenobu | ............... | G09G 3/3696 |
| | | | | 345/98 |
| 2013/0194031 A1* | 8/2013 | Poulton | ............... | H04L 25/0272 |
| | | | | 327/536 |
| 2023/0047577 A1* | 2/2023 | Bolton | ............... | H04B 1/40 |

* cited by examiner

POSITIVE-AND-NEGATIVE-VOLTAGE CHARGE PUMP CIRCUIT, CHIP AND COMMUNICATION TERMINAL

BACKGROUND

Technical Field

The present disclosure relates to a positive-and-negative-voltage charge pump circuit, meanwhile, relates to an integrated circuit chip and a corresponding communication terminal including the positive-and-negative-voltage charge pump circuit, and belongs to the technical field of analog integrated circuits.

Related Art

With continuous improvement of an integration level of an integrated circuit, constant evolution of process nodes towards a deep submicron limit and diversification of a chip application environment, a charge pump circuit serving as a basic module circuit is widely applied to various integrated circuit products. A main function of the charge pump circuit is to provide a positive voltage source higher than an input supply voltage positive rail and a negative voltage source lower than an input supply voltage negative rail for a system, thereby better satisfying design indexes of the system. Although a positive power supply high-voltage charge pump circuit has been applied to many application scenarios, along with constant improvement of the system index requirements, more and more electronic systems are required to simultaneously generate a positive high voltage and a negative high voltage inside to ensure stable and reliable work. Thus, the demands for a charge pump circuit design capable of providing stable and reliable voltages, and simultaneously generating voltages higher than the input power supply positive rail voltage and lower than the input power supply negative rail voltage have increasingly become urgent.

The Chinese patent No. ZL200810142157.2 discloses a positive-and-negative high-voltage charge pump circuit, which has a working principle that based on an asymmetric cross-coupled unilateral-cascade charge pump structure, positive high voltage output or negative high voltage output is realized through a selector. However, the circuit cannot output the positive supply voltage and the negative supply voltage at the same time. In addition, the Chinese patent No. ZL201610004368.4 discloses a charge pump circuit generating positive and negative voltage sources, which adopts a three-phase frequency divider to control capacitor charge and discharge by three clock signals in a fixed pulse sequence, thereby realizing output of the positive and negative voltage sources. Although the circuit can realize positive and negative voltage source output, absolute values of the output voltage sources are both lower than the input voltage source, and as a result, there is a great limitation in practical application.

SUMMARY

A first technical problem required to be solved by the present disclosure is to provide a positive-and-negative-voltage charge pump circuit.

Another technical problem required to be solved by the present disclosure is to provide a chip including a positive-and-negative-voltage charge pump circuit and a corresponding communication terminal.

In order to achieve the above purposes, the present disclosure adopts following technical solutions:

According to a first aspect of an embodiment of the present disclosure, a positive-and-negative-voltage charge pump circuit is provided and includes a clock generation module, a positive-voltage charge pump module, a transient enhancement module and a negative-voltage charge pump module; an output end of the clock generation module is connected to an input end of the positive-voltage charge pump module and an input end of the negative-voltage charge pump module, an output end of the positive-voltage charge pump module is connected to an input end of the transient enhancement module, an output end of the transient enhancement module is connected to an input power supply end of the negative-voltage charge pump module, and power supply ends of the clock generation module, the positive-voltage charge pump module and the transient enhancement module are all connected to a supply voltage; and the positive-voltage charge pump module generates a positive voltage according to a clock signal outputted by the clock generation module, the positive voltage and the supply voltage serve as input voltage sources to be sampled by the transient enhancement module and converted into currents for comparison, and a switchable input voltage is provided for the negative-voltage charge pump module according to a comparison result, such that the negative-voltage charge pump module generates a negative voltage according to the clock signal outputted by the clock generation module.

Preferably, the positive-voltage charge pump module includes a first clock conversion unit and at least one positive-voltage charge pump unit, an input end of the first clock conversion unit is connected to the output end of the clock generation module, and an output end of the first clock conversion unit is connected to an input end of each positive-voltage charge pump unit.

Preferably, the first clock conversion unit includes a first inverter, a second inverter, a third inverter, a fourth inverter, a fifth inverter, a first NAND gate and a second NAND gate; and an input end of the first inverter is connected to the output end of the clock generation module and one input end of the second NAND gate, an output end of the first inverter is connected to one input end of the first NAND gate, an output end of the first NAND gate is connected to an input end of the second inverter, an output end of the second inverter is connected to a first output end and an input end of the third inverter, an output end of the third inverter is connected to the other input end of the second NAND gate and a second output end, an output end of the second NAND gate is connected to an input end of the fourth inverter, an output end of the fourth inverter is connected to a fourth output end and an input end of the fifth inverter, and an output end of the fifth inverter is connected to the other input end of the first NAND gate and a third output end.

Preferably, in a case that a plurality of positive-voltage charge pump units are adopted, starting from the second positive-voltage charge pump unit, an input voltage of each positive-voltage charge pump unit is connected to a positive voltage output end of the previous positive-voltage charge pump unit.

Preferably, the positive-voltage charge pump unit includes a first NMOS tube, a second NMOS tube, a first PMOS tube, a second PMOS tube, a third NMOS tube, a fourth NMOS tube, a third PMOS tube, a fourth PMOS tube, a first capacitor, a second capacitor and a third capacitor; a gate of the first NMOS tube is connected to a fourth output end of the first clock conversion unit, sources of the first NMOS tube and the second NMOS tube are respectively grounded, a drain of the first NMOS tube is respectively connected to one end of the second capacitor and a drain of the first PMOS tube, a gate of the first PMOS tube is connected to a second output end of the first clock conversion unit, and a gate of the second NMOS tube is connected to a first output end of the first clock conversion unit; and a drain of the second NMOS tube is respectively connected to one end of the first capacitor and a drain of the second PMOS tube, a gate of the second PMOS tube is connected to a third output end of the first clock conversion unit, sources of the second PMOS tube, the first PMOS tube, the third NMOS tube and the fourth NMOS tube are connected with an input voltage, a gate of the fourth NMOS tube is respectively connected to a drain of the third NMOS tube, the other end of the first capacitor, a gate of the fourth PMOS tube and a drain of the third PMOS tube, a gate of the third NMOS tube is respectively connected to a drain of the fourth NMOS tube, the other end of the second capacitor, a gate of the third PMOS tube and a drain of the fourth PMOS tube, sources of the third PMOS tube and the fourth PMOS tube are respectively connected to one end of the third capacitor and the positive voltage output end, and the other end of the third capacitor is grounded.

Preferably, the transient enhancement module includes a voltage sampling comparison unit and a voltage switching unit, an input end of the voltage sampling comparison unit is connected to the positive voltage output end of the positive-voltage charge pump unit and the supply voltage, and an output end of the voltage sampling comparison unit is connected to an input end of the voltage switching unit.

Preferably, the voltage sampling comparison unit includes a first resistor, a fifth NMOS tube, a sixth NMOS tube, a seventh NMOS tube, an eighth NMOS tube, a fifth PMOS tube, a sixth PMOS tube, a second resistor, a third resistor and a fourth capacitor; one end of the first resistor and sources of the fifth PMOS tube and the sixth PMOS tube are respectively connected to the supply voltage, and the other end of the first resistor is respectively connected to a drain and a gate of the fifth NMOS tube and a gate of the sixth NMOS tube; a drain of the sixth NMOS tube is respectively connected to a drain and a gate of the fifth PMOS tube and a gate of the sixth PMOS tube; a drain of the sixth PMOS tube is respectively connected to one end of the fourth capacitor, one end of the third resistor, a drain of the seventh NMOS tube and the voltage switching unit; a gate of the seventh NMOS tube is respectively connected to a gate and a drain of the eighth NMOS tube and one end of the second resistor, and the other end of the second resistor is connected to the positive voltage output end of the positive-voltage charge pump unit; and sources of the eighth NMOS tube and the seventh NMOS tube, the other end of the third resistor, the other end of the fourth capacitor, and sources of the sixth NMOS tube and the fifth NMOS tube are all grounded.

Preferably, the voltage switching unit includes a hysteresis inverter, a logic level conversion subunit and a switching subunit; and an input end of the hysteresis inverter is connected to the output end of the voltage sampling comparison unit, an output end of the hysteresis inverter is connected to an input end of the logic level conversion subunit, and an output end of the logic level conversion subunit is connected to an input end of the switching subunit.

Preferably, the logic level conversion subunit includes a sixth inverter, a seventh inverter, a twelfth NMOS tube, a thirteenth NMOS tube, a fourteenth NMOS tube, a fifteenth NMOS tube, a sixteenth NMOS tube, a seventeenth NMOS tube, an eighteenth NMOS tube, a tenth PMOS tube, an eleventh PMOS tube, a twelfth PMOS tube, a thirteenth PMOS tube, a fourteenth PMOS tube, a fifteenth PMOS tube, a fifth capacitor, a sixth capacitor, a third NAND gate, a fourth NAND gate, an XOR gate and a plurality of digital delay units; an input end of the sixth inverter is connected to the output end of the hysteresis inverter, an output end of the sixth inverter is connected to an input end of the seventh inverter and a gate of the thirteenth NMOS tube, and an output end of the seventh inverter is connected to one input end of the switching subunit and a gate of the fourteenth NMOS tube; a Node X is respectively connected to the output end of the hysteresis inverter, an input end of the first digital delay unit and one input end of the XOR gate, the plurality of digital delay units are connected between an output end of the first digital delay unit and an input end of the last digital delay unit in series, an output end of the last digital delay unit is connected to the other input end of the XOR gate, an output end of the XOR gate is respectively connected to gates of the eighteenth NMOS tube and the seventeenth NMOS tube and gates of the fourteenth PMOS tube and the fifteenth PMOS tube, a drain of the fifteenth PMOS tube is respectively connected to one end of the sixth capacitor and a drain of the eighteenth NMOS tube, a source of the eighteenth NMOS tube is connected to a drain of the fourteenth NMOS tube, and the other end of the sixth capacitor is respectively connected to a source of the fifteenth NMOS tube, one input end of the third NAND gate and a drain of the tenth PMOS tube; a drain of the fifteenth NMOS tube is respectively connected to a drain of the sixteenth NMOS tube, a source of the sixteenth NMOS tube is respectively connected to a drain of the eleventh PMOS tube, one end of the fifth capacitor and one input end of the fourth NAND gate, the other end of the fifth capacitor is respectively connected to a drain of the fourteenth PMOS tube and a drain of the seventeenth NMOS tube, a source of the seventeenth NMOS tube is connected to a drain of the thirteenth NMOS tube, a gate of the twelfth NMOS tube is connected to a drain of the fifth NMOS tube, a drain of the twelfth NMOS tube is respectively connected to a drain and a gate of the thirteenth PMOS tube and gates of the sixteenth NMOS tube and the fifteenth NMOS tube; and a source of the thirteenth PMOS tube is respectively connected to a drain and a gate of the twelfth PMOS tube and gates of the eleventh PMOS tube and the tenth PMOS tube, sources of the twelfth PMOS tube, the eleventh PMOS tube and the tenth PMOS tube and the drains of the fifteenth NMOS tube and the sixteenth NMOS tube are all connected to the positive voltage output end of the positive-voltage charge pump unit, sources of the fourteenth NMOS tube, the thirteenth NMOS tube and the twelfth NMOS tube are respectively grounded, sources of the fourteenth PMOS tube and the fifteenth PMOS tube are respectively connected to a negative rail voltage of the located voltage domain, the other input end of the third NAND gate is respectively connected to an output end of the fourth NAND gate and the other input end of the switching subunit, and an output end of the third NAND gate is connected to the other input end of the fourth NAND gate.

Preferably, the switching subunit includes a sixteenth PMOS tube and a seventeenth PMOS tube, a gate of the sixteenth PMOS tube is connected to the output end of the fourth NAND gate, a source of the sixteenth PMOS tube is connected to the positive voltage output end of the positive-voltage charge pump unit, a gate of the seventeenth PMOS tube is connected to the output end of the seventh inverter, a source of the seventeenth PMOS tube is connected to the supply voltage, and drains of the seventeenth PMOS tube and the sixteenth PMOS tube serve as output ends of the switching subunit.

Preferably, the negative-voltage charge pump module includes a second clock conversion unit and a negative-voltage charge pump unit, an input end of the second clock conversion unit is connected to the output end of the clock generation module, an output end of the second clock conversion unit is connected to an input end of the negative-voltage charge pump unit, and the input end of the negative-voltage charge pump unit is connected to an output end of the voltage switching unit.

Preferably, the second clock conversion unit includes an eighth inverter, a ninth inverter, a tenth inverter, an eleventh inverter, a twelfth inverter, a fifth NAND gate and a sixth NAND gate; and an input end of the eighth inverter is connected to the output end of the clock generation module and one input end of the sixth NAND gate, an output end of the eighth inverter is connected to one input end of the fifth NAND gate, an output end of the fifth NAND gate is connected to an input end of the ninth inverter, an output end of the ninth inverter is connected to a fifth output end and an input end of the tenth inverter, an output end of the tenth inverter is connected to the other input end of the sixth NAND gate and a sixth output end, an output end of the sixth NAND gate is connected to an input end of the eleventh inverter, an output end of the eleventh inverter is connected to an eighth output end and an input end of the twelfth inverter, and an output end of the twelfth inverter is connected to the other input end of the fifth NAND gate and a seventh output end.

Preferably, the negative-voltage charge pump unit includes an eighteenth PMOS tube, a nineteenth PMOS tube, a nineteenth NMOS tube, a twentieth NMOS tube, a twentieth PMOS tube, a twenty-first PMOS tube, a twenty-first NMOS tube, a twenty-second NMOS tube, a seventh capacitor, an eighth capacitor and a ninth capacitor; a gate of the eighteenth PMOS tube is connected to an eighth output end of the second clock conversion unit, drains of the eighteenth PMOS tube and the nineteenth PMOS tube are respectively connected to the output voltage of the voltage switching unit, a source of the eighteenth PMOS tube is respectively connected to one end of the eighth capacitor and a source of the nineteenth NMOS tube, a gate of the nineteenth NMOS tube is connected to a sixth output end of the second clock conversion unit, and a gate of the nineteenth PMOS tube is connected to a fifth output end of the second clock conversion unit; a source of the nineteenth PMOS tube is respectively connected to one end of the seventh capacitor and a source of the twentieth NMOS tube, a gate of the twentieth NMOS tube is connected to a seventh output end of the second clock conversion unit, and drains of the nineteenth NMOS tube, the twentieth NMOS tube, the twentieth PMOS tube and the twenty-first PMOS tube are respectively grounded; and a gate of the twenty-first PMOS tube is respectively connected to a source of the twentieth PMOS tube, the other end of the seventh capacitor, a gate of the twenty-second NMOS tube and a source of the twenty-first NMOS tube, a gate of the twentieth PMOS tube is respectively connected to a source of the twenty-first PMOS tube, the other end of the eighth capacitor, a gate of the twenty-first NMOS tube and a source of the twenty-second NMOS tube, drains of the twenty-first NMOS tube and the twenty-second NMOS tube are respectively connected to one end of the ninth capacitor and a negative-voltage output end, and the other end of the ninth capacitor is grounded.

According to a second aspect of an embodiment of the present disclosure, an integrated circuit chip is provided and includes the above positive-and-negative-voltage charge pump circuit.

According to a third aspect of an embodiment of the present disclosure, a communication terminal is provided and includes the above positive-and-negative-voltage charge pump circuit.

According to the positive-and-negative-voltage charge pump circuit provided by the embodiment of the present disclosure, the positive voltage is generated by the positive-voltage charge pump module according to the clock signal outputted by the clock generation module, meanwhile, the positive voltage and the supply voltage are sampled by the transient enhancement module and converted into the currents for comparison, and the switchable input voltage is provided for the negative-voltage charge pump module according to the comparison result. The negative-voltage charge pump module can not only rapidly and reliably establish the negative voltage according to the clock signal outputted by the clock generation module so as to improve the speed and efficiency of generating the negative voltage by the negative-voltage charge pump module, but also flexibly satisfy different negative voltage requirements.

DETAILED DESCRIPTION

The technical content of the present disclosure is further described in detail in combination with drawings and specific embodiments as below.

Figure 1:
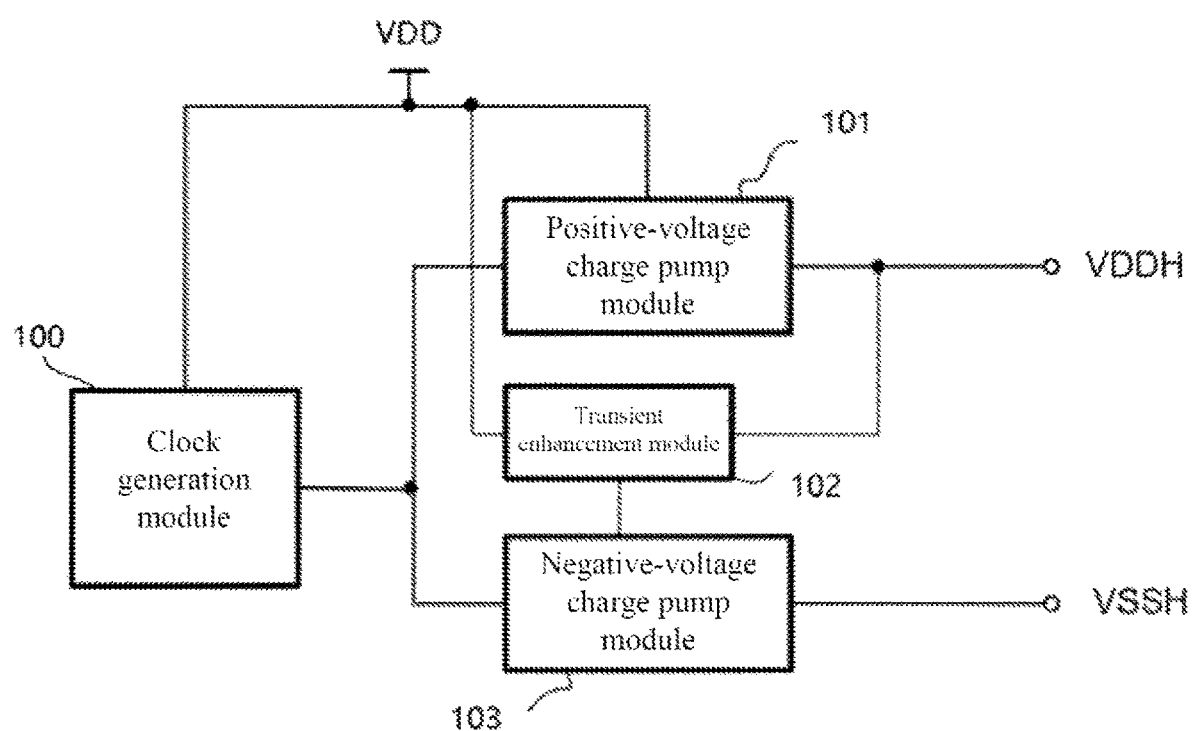
FIG. 1 is a schematic block diagram of a positive-and-negative-voltage charge pump circuit according to an embodiment of the present disclosure.

In order to stably and reliably realize output of a positive voltage higher than an input supply voltage positive rail and a negative voltage lower than an input supply voltage negative rail at the same time and make the output negative voltage flexibly and rapidly established, as shown in FIG. 1, an embodiment of the present disclosure provides a positive-and-negative-voltage charge pump circuit, including a clock generation module 100, a positive-voltage charge pump module 101, a transient enhancement module 102 and a negative-voltage charge pump module 103. An output end of the clock generation module 100 is connected to an input end of the positive-voltage charge pump module 101 and an input end of the negative-voltage charge pump module 103. An output end of the positive-voltage charge pump module 101 is connected to an input end of the transient enhancement module 102. An output end of the transient enhancement module 102 is connected to an input power supply end of the negative-voltage charge pump module 103. Power supply ends of the clock generation module 100, the positive-voltage charge pump module 101 and the transient enhancement module 102 are all connected to a supply voltage VDD.

The positive-voltage charge pump module 101 generates a positive voltage according to a clock signal outputted by the clock generation module 100. The positive voltage and the supply voltage serve as input voltage sources to be sampled by the transient enhancement module 102 and converted into currents for comparison. According to a comparison result, a switchable input voltage is provided for the negative-voltage charge pump module 103, such that the negative-voltage charge pump module 103 generates a negative voltage output according to the clock signal outputted by the clock generation module 100.

The clock generation module 100 is configured to generate the clock signal. The clock generation module 100 may be realized by an oscillator of any structure, and mainly aims to provide the clock signal with a certain frequency for the positive-voltage charge pump module 101 and the negative-voltage charge pump module 103.

Figure 2:
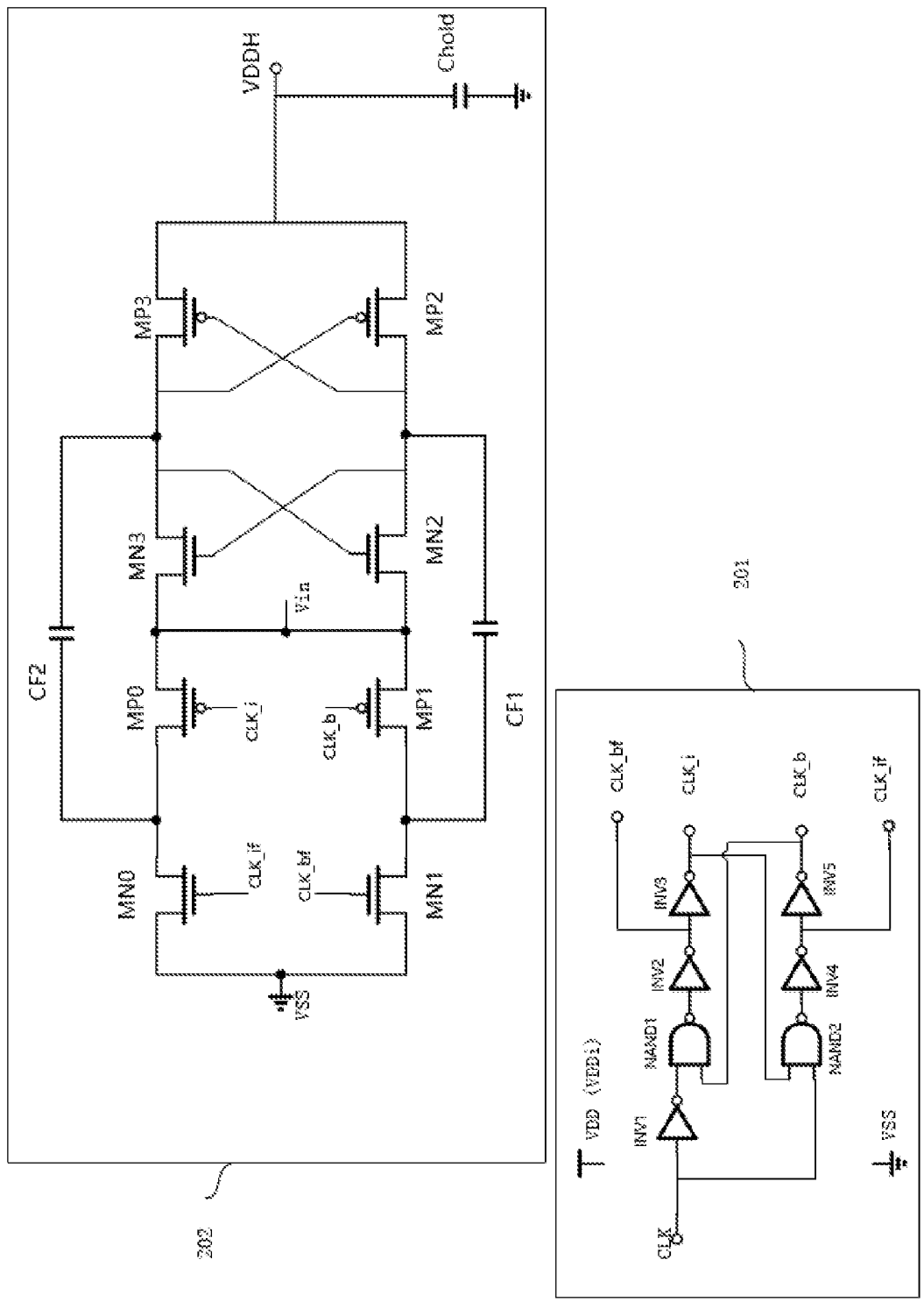
FIG. 2 is a circuit schematic diagram of a positive-voltage charge pump module in the positive-and-negative-voltage charge pump circuit according to the embodiment of the present disclosure.

As shown in FIG. 2, the positive-voltage charge pump module 101 includes a first clock conversion unit 201 and at least one positive-voltage charge pump unit 202. An input end of the first clock conversion unit 201 is connected to the output end of the clock generation module 100, and an output end of the first clock conversion unit 201 is connected to an input end of each positive-voltage charge pump unit 202.

The first clock conversion unit 201 is configured to convert the clock signal outputted by the clock generation module 100 and generate two paths of complementary non-overlapping clock signals. As shown in FIG. 2, the first clock conversion unit 201 includes a first inverter INV1, a second inverter INV2, a third inverter INV3, a fourth inverter INV4, a fifth inverter INV5, a first NAND gate NAND1 and a second NAND gate NAND2. An input end of the first inverter INV1 is connected to the output end of the clock generation module 100 and one input end of the second NAND gate NAND2. An output end of the first inverter INV1 is connected to one input end of the first NAND gate NAND1. An output end of the first NAND gate NAND1 is connected to an input end of the second inverter INV2. An output end of the second inverter INV2 is connected to a first output end and an input end of the third inverter INV3. An output end of the third inverter INV3 is connected to the other input end of the second NAND gate NAND2 and a second output end. An output end of the second NAND gate NAND2 is connected to an input end of the fourth inverter INV4. An output end of the fourth inverter INV4 is connected to a fourth output end and an input end of the fifth inverter INV5. An output end of the fifth inverter INV5 is connected to the other input end of the first NAND gate NAND1 and a third output end.

The first clock conversion unit 201 receives the clock signal CLK outputted by the clock generation module 100, and converts, by the inverters INV1-INV5 and the two input NAND gates NAND1 and NAND2, the clock signal CLK into two paths of non-overlapping clock signals: a first path of non-overlapping clock signals CLK_i and CLK_b and a second path of non-overlapping clock signals CLK_if and CLK_bf. Converting, by the first clock conversion unit 201, the clock signal CLK into the two paths of non-overlapping clock signals is an existing mature technology, which is not described herein in detail.

In addition, if the first clock conversion unit 201 is different from the received clock signal CLK in voltage domain, the first clock conversion unit 201 is required to finish a level conversion function. For example: the voltage domain of the clock signal CLK is between the supply voltage VDD and a ground voltage VSS, where the supply voltage VDD is an input signal voltage positive rail, and VSS is an input signal voltage negative rail; and the first clock conversion unit 201 is required to convert an amplitude of the clock signal CLK into a voltage domain between a positive rail value VDDi of a target voltage to be converted and the ground voltage VSS.

As shown in FIG. 2, the positive-voltage charge pump unit 202 includes a first NMOS tube MN0, a second NMOS tube MN1, a first PMOS tube MP0, a second PMOS tube MP1, a third NMOS tube MN2, a fourth NMOS tube MN3, a third PMOS tube MP2, a fourth PMOS tube MP3, a first capacitor CF1, a second capacitor CF2 and a third capacitor Chold. A gate of the first NMOS tube MN0 is connected to a fourth output end of the first clock conversion unit 201. Sources of the first NMOS tube MN0 and the second NMOS tube MN1 are both grounded. A drain of the first NMOS tube MN0 is respectively connected to one end of the second capacitor CF2 and a drain of the first PMOS tube MP0. A gate of the first PMOS tube MP0 is connected to a second output end of the first clock conversion unit 201. A gate of the second NMOS tube MN1 is connected to a first output end of the first clock conversion unit 201. A drain of the second NMOS tube MN1 is respectively connected to one end of the first capacitor CF1 and a drain of the second PMOS tube MP1. A gate of the second PMOS tube MP1 is connected to a third output end of the first clock conversion unit 201. Sources of the second PMOS tube MP1, the first PMOS tube MP0, the third NMOS tube MN2 and the fourth NMOS tube MN3 are connected with an input voltage Vin. A gate of the fourth NMOS tube MN3 is respectively connected to a drain of the third NMOS tube MN2, the other end of the first capacitor CF1, a gate of the fourth PMOS tube MP3 and a drain of the third PMOS tube MP2. A gate of the third NMOS tube MN2 is respectively connected to a drain of the fourth NMOS tube MN3, the other end of the second capacitor CF2, a gate of the third PMOS tube MP2 and a drain of the fourth PMOS tube MP3. Sources of the third PMOS tube MP2 and the fourth PMOS tube MP3 are respectively connected to one end of the third capacitor Chold and a positive voltage output end VDDH. The other end of the third capacitor Chold is grounded.

The first NMOS tube MN0, the second NMOS tube MN1, the first PMOS tube MP0 and the second PMOS tube MP1 are switching tubes respectively, and the third NMOS tube MN2, the fourth NMOS tube MN3, the third PMOS tube MP2 and the fourth PMOS tube MP3 are transmission tubes respectively. The two paths of complementary non-overlapping clock signals outputted by the first clock conversion unit 201 control conduction and cutoff of the first NMOS tube MN0, the second NMOS tube MN1, the first PMOS tube MP0 and the second PMOS tube MP1, thereby realizing gradual charge and discharge on the first capacitor CF1 and the second capacitor CF2, and through the conduction and cutoff of the third NMOS tube MN2, the fourth NMOS tube MN3, the third PMOS tube MP2 and the fourth PMOS tube MP3, charges of the first capacitor CF1 and the second capacitor CF2 are transmitted to the third capacitor Chold, thereby realizing positive voltage output. The first capacitor CF1 is equal to the second capacitor CF2 in capacitance, and the highest input voltage Vin is equal to the supply voltage VDD.

Specifically, taking the highest input voltage Vin being equal to the supply voltage VDD as an example, when the non-overlapping clock signal CLK_i is a high level, that is, the first clock conversion unit 201 provides the supply voltage VDD, the non-overlapping clock signal CLK_b is a low level, that is, the first clock conversion unit 201 provides the ground voltage VSS, and meanwhile the levels of the non-overlapping clock signal CLK_if and CLK_bf are the supply voltage VDD and the ground voltage VSS respectively. At the time, the first NMOS tube MN0 and the second PMOS tube MP1 are in a conduction state, and the first PMOS tube MP0 and the second NMOS tube MN1 are in a cutoff state, such that the two ends of the first capacitor CF1 are respectively connected with the supply voltage VDD, thereby supplying the gate voltage twice the supply voltage VDD to the fourth NMOS tube MN3. The source voltage of the fourth NMOS tube MN3 is VDD, such that the fourth NMOS tube MN3 is in a conduction state. The gate voltage of the third PMOS tube MP2 is the supply voltage VDD, such that the third PMOS tube MP2 is in a conduction state. As a result, the charges in the first capacitor CF1 are all transmitted to the third capacitor Chold through the third PMOS tube MP2, that is, the third capacitor Chold is charged, thereby realizing positive voltage output. The gate voltage and the source voltage of the third NMOS tube MN2 are both the supply voltage VDD, such that the third NMOS tube MN2 is in a cutoff state, the fourth PMOS tube MP3 is similarly in a cutoff state, one end of the second capacitor CF2 is connected with the supply voltage VDD, and the other end is connected with the ground voltage VSS, thereby charging the second capacitor CF2.

In a similar way, when the non-overlapping clock signal CLK_i is a low level, that is, the first clock conversion unit 201 provides the ground voltage VSS, the non-overlapping clock signal CLK_b is a high level, that is, the first clock conversion unit 201 provides the supply voltage VDD, and meanwhile the levels of the non-overlapping clock signal CLK_if and CLK_bf are the ground voltage VSS and the supply voltage VDD respectively. At the time, the second NMOS tube MN1 and the first PMOS tube MP0 are in a conduction state, and the first NMOS tube MN0 and the second PMOS tube MP1 are in a cutoff state, such that the two ends of the second capacitor CF2 are respectively connected with the supply voltage VDD, thereby supplying the gate voltage twice the supply voltage VDD to the third NMOS tube MN2. The source voltage of the third NMOS tube MN2 is VDD, such that the third NMOS tube MN2 is in a conduction state. The gate voltage of the fourth PMOS tube MP3 is the supply voltage VDD, such that the fourth PMOS tube MP3 is in a conduction state. As a result, the charges in the second capacitor CF2 are all transmitted to the third capacitor Chold through the fourth PMOS tube MP3, that is, the third capacitor Chold is charged, thereby realizing positive voltage output. The gate voltage and the source voltage of the fourth NMOS tube MN3 are both the supply voltage VDD, such that the fourth NMOS tube MN3 is in a cutoff state, the third PMOS tube MP2 is similarly in a cutoff state, one end of the first capacitor CF1 is connected with the supply voltage VDD, and the other end is connected with the ground voltage VSS, thereby charging the first capacitor CF1. By carrying the charges in the first capacitor CF1 and the second capacitor CF2 in several cycles, the positive voltage output end VDDH finally outputs the twice the supply voltage VDD.

It is to be emphasized that the non-overlapping clock signals CLK_if and CLK_bf respectively correspond to non-overlapping clock signals ahead the non-overlapping clock signals CLK_i and CLK_b by phases. In addition, the non-overlapping clock signal CLK_if and the non-overlapping clock signal CLK_i are same-phase non-overlapping clock signals, and the non-overlapping clock signal CLK_bf and the non-overlapping clock signal CLK_b are same-phase non-overlapping clock signals. Through the non-overlapping clock signals CLK_if and CLK_bf, the problem that the PMOS tubes and the NMOS tubes in the positive-voltage charge pump unit 202 are conducted at the same time can be solved.

In addition, if the positive voltage output end VDDH of the positive-voltage charge pump unit 202 is required to output a higher positive voltage, a plurality of positive-voltage charge pump units 202 may be adopted to be cascaded, that is, starting from the second positive-voltage charge pump unit 202, the input voltage Vin of each positive-voltage charge pump unit 202 is connected to the positive voltage output end VDDH of the previous positive-voltage charge pump unit 202.

Figure 3:
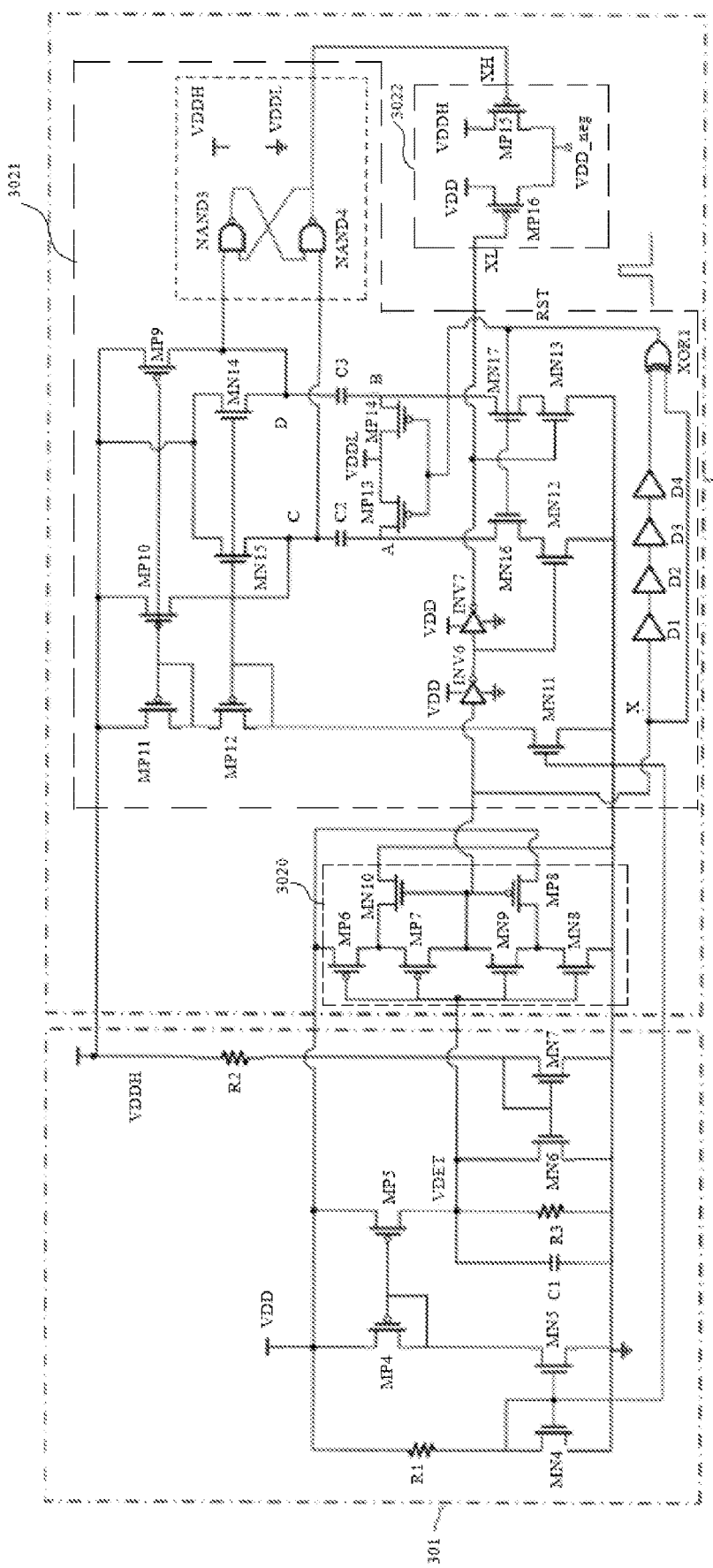
FIG. 3 is a circuit schematic diagram of a transient enhancement module in the positive-and-negative-voltage charge pump circuit according to the embodiment of the present disclosure.

As shown in FIG. 3, the transient enhancement module 102 includes a voltage sampling comparison unit 301 and a voltage switching unit 302. An input end of the voltage sampling comparison unit 301 is connected to the positive voltage output end VDDH of the positive-voltage charge pump unit 202 and the supply voltage VDD, and an output end of the voltage sampling comparison unit 301 is connected to an input end of the voltage switching unit 302. The voltage sampling comparison unit 301 samples the positive voltage and the supply voltage VDD outputted by the positive-voltage charge pump unit 202 and converts the positive voltage and the supply voltage VDD into corresponding currents for comparison, such that a Node VDET outputs a state of a detection signal. The voltage switching unit 302 performs necessary level conversion processing on the state of the detection signal, then, a control switch realizes voltage switchover, such that a switchable input voltage is provided for the negative-voltage charge pump module 103, and accordingly, the speed and efficiency of generating the negative voltage by the negative-voltage charge pump module 103 are improved.

As shown in FIG. 3, the voltage sampling comparison unit 301 includes a first resistor R1, a fifth NMOS tube MN4, a sixth NMOS tube MN5, a seventh NMOS tube MN6, an eighth NMOS tube MN7, a fifth PMOS tube MP4, a sixth PMOS tube MP5, a second resistor R2, a third resistor R3 and a fourth capacitor C1. One end of the first resistor R1 and sources of the fifth PMOS tube MP4 and the sixth PMOS tube MP5 are respectively connected to the supply voltage VDD, and the other end of the first resistor R1 is respectively connected to a drain and a gate of the fifth NMOS tube MN4 and a gate of the sixth NMOS tube MN5. A drain of the sixth NMOS tube MN5 is respectively connected to a drain and a gate of the fifth PMOS tube MP4 and a gate of the sixth PMOS tube MP5. A drain of the sixth PMOS tube MP5 is respectively connected to one end of the fourth capacitor C1, one end of the third resistor R3, a drain of the seventh NMOS tube MN6 and the voltage switching unit 302. A gate of the seventh NMOS tube MN6 is respectively connected to a gate and a drain of the eighth NMOS tube MN7 and one end of the second resistor R2, and the other end of the second resistor R2 is connected to the positive voltage output end VDDH of the positive-voltage charge pump unit 202. Sources of the eighth NMOS tube MN7 and the seventh NMOS tube MN6, the other end of the third resistor R3, the other end of the fourth capacitor C1, and sources of the sixth NMOS tube MN5 and the fifth NMOS tube MN4 are all grounded.

According to a working principle of the voltage sampling comparison unit 301: The second resistor R2 and the eighth NMOS tube MN7 sample the output voltage of the positive voltage output end VDDH of the positive-voltage charge pump unit 202 and convert the positive voltage into a corresponding current, and the current is copied by the seventh NMOS tube MN6 according to a preset proportion. The first resistor R1 and the fifth NMOS tube MN4 sample the supply voltage VDD and convert the supply voltage VDD into a corresponding current, and the current is copied sequentially through the sixth NMOS tube MN5, the fifth PMOS tube MP4 and the sixth PMOS tube MP5 according to a preset proportion. The positive voltage outputted by the positive voltage output end VDDH of the positive-voltage charge pump unit 202 and the supply voltage VDD are sampled and converted into the corresponding currents, and the currents are correspondingly copied to the drain of the eighth NMOS tube MN7 and the drain of the sixth PMOS tube MP5 according to the preset proportions and respectively represented as:

$$I_{D7} = \frac{1}{R_2 \cdot \beta_3}\left[1 - R_1 \cdot \beta_0 \cdot (VDDH - V_T) - \sqrt{2 \cdot R_2 \cdot \beta_3 \cdot (VDDH - V_T)}\right] \quad (1)$$

$$I_{D5} = \frac{1}{R_1 \cdot \beta_0}\left[1 - R_1 \cdot \beta_0 \cdot (VDD - V_T) - \sqrt{2 \cdot R_1 \cdot \beta_0 \cdot (VDD - V_T)}\right] \quad (2)$$

In the above formulas, $R_1$ denotes a first resistance, $R_2$ denotes a second resistance, $\beta_0 = \mu nCoxW0/L0$, $\beta_3 = \mu nCoxW3/L3$, $\mu n$ denotes electron mobility, Cox denotes gate oxide capacitance, W0/L0 denotes a width-to-length ratio of the fifth NMOS tube MN4, and W3/L3 denotes a width-to-length ratio of the eighth NMOS tube MN7; and VDDH denotes the positive voltage outputted by the positive voltage output end VDDH of the positive-voltage charge pump unit, VDD denotes the supply voltage, and $V_T$ denotes a circuit design threshold voltage.

When the positive voltage outputted by the positive voltage output end VDDH of the positive-voltage charge pump unit 202 is equal to the supply voltage VDD, the current in the sixth PMOS tube MP5 is greater than the current in the seventh NMOS tube MN6, such that the state of the detection signal outputted by the Node VDET approaches the high level of the supply voltage VDD, and along with gradual increasing of the positive voltage outputted by the positive voltage output end VDDH of the positive-voltage charge pump unit 202, $I_{D7}$ current is increased accordingly. When the positive voltage outputted by the positive voltage output end VDDH of the positive-voltage charge pump unit 202 exceeds the circuit design threshold voltage or reaches a target steady state (e.g., twice the supply voltage VDD), the current in the seventh NMOS tube MN6 is far greater than the current in the sixth PMOS tube MP5, and the state of the detection signal outputted by the Node VDET jumps into output of a low-level ground voltage VSS from a high-level supply voltage VDD. As result, the positive voltage outputted by the positive voltage output end VDDH of the positive-voltage charge pump unit 202 is dynamically detected. The state of the detection signal outputted by the voltage sampling comparison unit 301 will change once as long as the positive voltage outputted by the positive voltage output end VDDH of the positive-voltage charge pump unit 202 rises or falls to a preset value.

As shown in FIG. 3, the voltage switching unit 302 includes a hysteresis inverter 3020, a logic level conversion subunit 3021 and a switching subunit 3022. An input end of the hysteresis inverter 3020 is connected to the output end of the voltage sampling comparison unit 301, an output end of the hysteresis inverter 3020 is connected to an input end of the logic level conversion subunit 3021, and an output end of the logic level conversion subunit 3021 is connected to an input end of the switching subunit 3022.

As shown in FIG. 3, the hysteresis inverter 3020 includes a ninth NMOS tube MN8, a tenth NMOS tube MN9, an eleventh NMOS tube MN10, a seventh PMOS tube MP6, an eighth PMOS tube MP7 and a ninth PMOS tube MP8. Gates of the ninth NMOS tube MN8, the tenth NMOS tube MN9, the seventh PMOS tube MP6 and the eighth PMOS tube MP7 are connected together to serve as the input end of the hysteresis inverter 3020 for connecting the Node VDET of the sampling comparison unit 301 and receiving the state of the detection signal outputted by the voltage sampling comparison unit 301. A drain of the ninth NMOS tube MN8 and a source of the tenth NMOS tube MN9 are respectively connected to a drain of the ninth PMOS tube MP8. A drain of the tenth NMOS tube MN9, a drain of the eighth PMOS tube MP7, and gates of the ninth PMOS tube MP8 and the eleventh NMOS tube MN10 are mutually connected to serve as the output end of the hysteresis inverter 3020. A source of the eighth PMOS tube MP7 and a drain of the seventh PMOS tube MP6 are respectively connected to a drain of the eleventh NMOS tube MN10. Sources of the seventh PMOS tube MP6 and the ninth PMOS tube MP8 are respectively connected to the supply voltage VDD. Sources of the ninth NMOS tube MN8 and the eleventh NMOS tube MN10 are grounded.

A working voltage domain of the hysteresis inverter 3020 is between the supply voltage VDD and the ground voltage VSS. A main function of the hysteresis inverter 3020 is to reshape the state of the detection signal outputted by the voltage sampling comparison unit 301 to obtain a logic level reverse to the state of the detection signal, realize a certain hysteresis function, and prevent the occurrence of a glitch level to the supply voltage VDD and the state of the detection signal, thereby making the circuit work more safely and reliably.

As shown in FIG. 3, the logic level conversion subunit 3021 includes a sixth inverter INV6, a seventh inverter INV7, a twelfth NMOS tube MN11, a thirteenth NMOS tube MN12, a fourteenth NMOS tube MN13, a fifteenth NMOS tube MN14, a sixteenth NMOS tube MN15, a seventeenth NMOS tube MN16, an eighteenth NMOS tube MN17, a tenth PMOS tube MP9, an eleventh PMOS tube MP10, a twelfth PMOS tube MP11, a thirteenth PMOS tube MP12, a fourteenth PMOS tube MP13, a fifteenth PMOS tube MP14, a fifth capacitor C2, a sixth capacitor C3, a third NAND gate NAND3, a fourth NAND gate NAND4, digital delay units D1 to D4 and an XOR gate XOR1. A connection relationship among various parts of the logic level conversion subunit 3021 is as below: An input end of the sixth inverter INV6 is connected to the output end of the hysteresis inverter 3020. An output end of the sixth inverter INV6 is respectively connected to an input end of the seventh inverter INV7 and a gate of the thirteenth NMOS tube MN12. An output end of the seventh inverter INV7 is respectively connected to an input end of the switching subunit 3022 and a gate of the fourteenth NMOS tube MN13. A Node X is respectively connected to the output end of the hysteresis inverter 3020, an input end of the first digital delay unit D1 and one input end of the XOR gate XOR1. The second digital delay unit D2 and the third digital delay unit D3 are connected between an output end of the first digital delay unit D1 and an input end of the fourth digital delay unit D4 in series. An output end of the fourth digital delay unit D4 is connected to the other input end of the XOR gate XOR1. An output end of the XOR gate XOR1 is respectively connected to gates of the eighteenth NMOS tube MN17 and the seventeenth NMOS tube MN16 and gates of the fourteenth PMOS tube MP13 and the fifteenth PMOS tube MP14. A drain of the fifteenth PMOS tube MP14 is respectively connected to one end of the sixth capacitor C3 and a drain of the eighteenth NMOS tube MN17. A source of the eighteenth NMOS tube MN17 is connected to a drain of the fourteenth NMOS tube MN13. The other end of the sixth capacitor C3 is respectively connected to a source of the fifteenth NMOS tube MN14, one input end of the third NAND gate NAND3 and a drain of the tenth PMOS tube MP9. A drain of the fifteenth NMOS tube MN14 is respectively connected to a drain of the sixteenth NMOS tube MN15. A source of the sixteenth NMOS tube MN15 is respectively connected to a drain of the eleventh PMOS tube MP10, one end of the fifth capacitor C2 and an input end of the fourth NAND gate NAND4. The other end of the fifth capacitor C2 is respectively connected to a drain of the fourteenth PMOS tube MP13 and a drain of the seventeenth NMOS tube MN16. A source of the seventeenth NMOS tube MN16 is connected to a drain of the thirteenth NMOS tube MN12. A gate of the twelfth NMOS tube MN11 is connected to a drain of the fifth NMOS tube. A drain of the twelfth NMOS tube MN11 is respectively connected to a drain and a gate of the thirteenth PMOS tube MP12 and gates of the sixteenth NMOS tube MN15 and the fifteenth NMOS tube MN14. A source of the thirteenth PMOS tube MP12 is respectively connected to a drain and a gate of the twelfth PMOS tube MP11 and gates of the eleventh PMOS tube MP10 and the tenth PMOS tube MP9. Sources of the twelfth PMOS tube MP11, the eleventh PMOS tube MP10 and the tenth PMOS tube MP9 and the drains of the fifteenth NMOS tube MN14 and the sixteenth NMOS tube MN15 are all connected to the positive voltage output end VDDH of the positive-voltage charge pump unit 202. Sources of the fourteenth NMOS tube MN13, the thirteenth NMOS tube MN12 and the twelfth NMOS tube MN11 are respectively grounded. Sources of the fourteenth PMOS tube MP13 and the fifteenth PMOS tube MP14 are respectively connected to a negative rail voltage VDDL of the located voltage domain. The other input end of the third NAND gate NAND3 is respectively connected to an output end of the fourth NAND gate NAND4 and the other input end of the switching subunit 3022. An output end of the third NAND gate NAND3 is connected to the other input end of the fourth NAND gate NAND4.

As shown in FIG. 3, the switching subunit 3022 includes a sixteenth PMOS tube MP15 and a seventeenth PMOS tube MP16. A gate of the sixteenth PMOS tube MP15 serves as the other input end of the switching subunit 3022 for connecting the output end of the fourth NAND gate NAND4. A source of the sixteenth PMOS tube MP15 is connected to the positive voltage output end VDDH of the positive-voltage charge pump unit 202. A gate of the seventeenth PMOS tube MP16 serves as an input end of the switching subunit 3022 for connecting the output end of the seventh inverter INV7. A source of the seventeenth PMOS tube MP16 is connected to the supply voltage VDD. Drains of the seventeenth PMOS tube MP16 and the sixteenth PMOS tube MP15 serve as output ends of the switching subunit 3022 for outputting a voltage VDD_neg, thereby providing a switchable input voltage for the negative-voltage charge pump module 103.

It is to be emphasized that a working voltage domain of the third NAND gate NAND3 and the fourth NAND gate NAND4 is between the positive voltage (a positive rail voltage value of the located voltage domain) outputted by the positive voltage output end VDDH of the positive-voltage charge pump unit 202 and the negative rail voltage VDDL of the located voltage domain. In the embodiment of the present disclosure, the negative rail voltage VDDL of the located voltage domain is set as the supply voltage VDD. After the state of the detection signal outputted by the voltage sampling comparison unit 301 is converted into the voltage domain between the positive voltage outputted by the positive voltage output end VDDH of the high-level positive-voltage charge pump unit 202 and the low-level supply voltage VDD from the voltage domain between the high-level supply voltage VDD and the low-level ground voltage VSS, an output voltage VDD_neg of the transient enhancement module 102 is selected by controlling gate voltages of switching tubes being the sixteenth PMOS tube MP15 and the seventeenth PMOS tube MP16. In addition, the twelfth NMOS tube MN11 copies, according to a preset proportion, a current in the fifth NMOS tube MN4 in the voltage sampling comparison unit 301. The twelfth PMOS tube MP11 is connected to the thirteenth PMOS tube MP12. The thirteenth PMOS tube MP12 is connected in a diode manner. The tenth PMOS tube MP9, the eleventh PMOS tube MP10 and the twelfth PMOS tube MP11 are proportional image current sources. The thirteenth PMOS tube MP12 provides a static gate voltage for the sixteenth NMOS tube MN15 and the fifteenth NMOS tube MN14. Gate voltages of the fourteenth PMOS tube MP13, the fifteenth PMOS tube MP14, the seventeenth NMOS tube MN16 and the eighteenth NMOS tube MN17 are controlled by a narrow pulse signal RST to pre-charge the fifth capacitor C2 and the sixth capacitor C3. The fifth capacitor C2 and the sixth capacitor C3 are equal in capacitance, charges of the two capacitors are initialized, and the narrow pulse signal RST is generated by logical combination of output signals at the Node X through the digital delay units D1 to D4 and the XOR gate XOR1, and then, the signal RST is utilized for realizing level conversion of the detection signal outputted by the Node VDET.

To facilitate understanding of the working principle of the voltage switching unit 302, the working principle of the voltage switching unit 302 is described in detail by combining the voltage sampling comparison unit 301. A working process of the transient enhancement module 102 is as follows: After the circuit is powered on, the positive-voltage charge pump module 101 starts to work. In the process that the positive voltage outputted by the positive voltage output end VDDH of the positive-voltage charge pump unit 202 starts to be gradually increased from the supply voltage VDD but not reach the target voltage, the state of the detection signal outputted by the Node VDET approaches the high level of the supply voltage VDD. Through the sixth inverter INV6 and the seventh inverter INV7, gate voltages of the thirteenth NMOS tube MN12 and the fourteenth NMOS tube MN13 are the supply voltage VDD and the ground voltage VSS respectively, such that the thirteenth NMOS tube MN12 is in a conduction state, the fourteenth NMOS tube MN13 is a in a cutoff state, and at the time, a gate voltage XL supplied to the seventeenth PMOS tube MP16 serving as a switching tube is set as the ground voltage VSS, thereby making the seventeenth PMOS tube MP16 in a conduction state.

When the state of the detection signal outputted by the Node VDET jumps, through reshaping via the hysteresis inverter 3020, the output signals at the Node X jump in state as well. The output signals are logically combined through the digital delay units D1 to D4 and the XOR gate XOR1, a narrow pulse signal RST with a high level being the supply voltage VDD is generated, and level conversion on the detection signal outputted by the Node VDET is realized through the signal RST.

After the supply voltage is normally powered on, the detection signal outputted by the Node VDET jumps into the supply voltage VDD from the ground voltage VSS, a voltage at the Node X jumps into the ground voltage VSS from the supply voltage VDD, and through a combination logic subunit constituted by the digital delay units D1 to D4 and the XOR gate XOR1, a narrow pulse signal RST with a high level being the supply voltage VDD is generated. When the level of the narrow pulse signal RST is the ground voltage VSS, the fourteenth PMOS tube MP13 and the fifteenth PMOS tube MP14 are conducted, the seventeenth NMOS tube MN16 and the eighteenth NMOS tube MN17 are cut off, and pole plates A and B of the fifth capacitor C2 and the sixth capacitor C3 are pre-charged to the supply voltage VDD. Meanwhile, pole plates C and D of the fifth capacitor C2 and the sixth capacitor C3 are charged by the tenth PMOS tube MP9 and the eleventh PMOS tube MP10 to the voltage equal to the positive voltage outputted by the positive voltage output end VDDH of the positive-voltage charge pump unit 202.

When the level of the narrow pulse signal RST is the supply voltage VDD, the fourteenth PMOS tube MP13 and the fifteenth PMOS tube MP14 are cut off, and the seventeenth NMOS tube MN16 and the eighteenth NMOS tube MN17 are conducted. The thirteenth NMOS tube MN12 is conducted, and the fourteenth NMOS tube MN13 is cut off, and thus, the voltage of the pole plate A of the fifth capacitor C2 is rapidly pulled to the ground voltage VSS, and the voltage of the pole plate C of the fifth capacitor C2 is rapidly reduced. When the voltage of the pole plate C of the fifth capacitor C2 is reduced to a certain amplitude, the sixteenth NMOS tube MN15 is conducted, and the voltage of the pole plate C of the fifth capacitor C2 is pulled up. Till the sixteenth NMOS tube MN15 is cut off, the voltage of the pole plate C of the fifth capacitor C2 is charged, by the fourteenth NMOS tube MN13, to a voltage equal to the positive voltage outputted by the positive voltage output end VDDH of the positive-voltage charge pump unit 202. In this process, because the fourteenth NMOS tube MN13 is in the cutoff state, a voltage across the sixth capacitor does not change.

After the level of the narrow pulse signal RST changes into the ground voltage VSS again, the fourteenth PMOS tube MP13 and the fifteenth PMOS tube MP14 are conducted again, the seventeenth NMOS tube MN16 and the eighteenth NMOS tube MN17 are cut off, and the fifth capacitor C2 and the sixth capacitor C3 are in a pre-charge state again, waiting for next narrow pulse trigger for the narrow pulse signal RST.

In the above process, the voltage of the pole plate D of the sixth capacitor C3 does not change in the whole process and is still kept equal to the positive voltage outputted by the positive voltage output end VDDH of the positive-voltage charge pump unit 202. Because the voltage of the pole plate C of the fifth capacitor C2 is reduced and then increased to be equal to the positive voltage outputted by the positive voltage output end VDDH of the positive-voltage charge pump unit 202, and when the voltage of the pole plate C of the fifth capacitor C2 approaches the supply voltage VDD, a voltage XH outputted by the fourth NAND gate NAND4 is pulled to be equal to the positive voltage outputted by the positive voltage output end VDDH of the positive-voltage charge pump unit 202, such that the sixteenth PMOS tube MP15 serving as the switching tube is in a cutoff state. The seventeenth PMOS tube MP16 is conducted, the sixteenth PMOS tube MP15 is cut off, and thus, in the state, the output voltage VDD_neg of the voltage switching unit 302 is equal to the supply voltage VDD.

When the positive voltage outputted by the positive voltage output end VDDH of the positive-voltage charge pump unit 202 is established or reaches the target voltage, the detection signal outputted by the Node VDET jumps into the low-level ground voltage VSS from the high-level supply voltage VDD, and the gate voltages of the thirteenth NMOS tube MN12 and the fourteenth NMOS tube MN13 are the ground voltage VSS and the supply voltage VDD respectively, such that the fourteenth NMOS tube MN13 is in a conduction state, the thirteenth NMOS tube MN12 is in a cutoff state, and as a result, the seventeenth PMOS tube MP16 is in a cutoff state. Meanwhile, the voltage of the Node X jumps into the supply voltage VDD from the ground voltage VSS, and through the combination logic subunit constituted by the digital delay units D1 to D4 and the XOR gate XOR1, a narrow pulse signal RST with a high level being the supply voltage VDD is generated, namely, an effective detection pulse, such that the voltage of the pole plate D of the sixth capacitor C3 is reduced and then increased while voltages of the two pole plates of the fifth capacitor C2 are kept unchangeable. Thus, a voltage outputted by the third NAND gate NAND3 is equal to the positive voltage, established or reaching the target voltage, outputted by the positive voltage output end VDDH of the positive-voltage charge pump unit 202, a voltage outputted by the fourth NAND gate NAND4 is the low-level supply voltage VDD, and the voltage XH outputted by the fourth NAND gate NAND4 is the supply voltage VDD. As a result, the sixteenth PMOS tube MP15 is in a conduction state. The seventeenth PMOS tube MP16 is cut off, the sixteenth PMOS tube MP15 is conducted, and thus, in the state, the output voltage VDD_neg of the voltage switching unit 302 is equal to the positive voltage, established or reaching the target voltage, outputted by the positive voltage output end VDDH of the positive-voltage charge pump unit 202.

Figure 4:
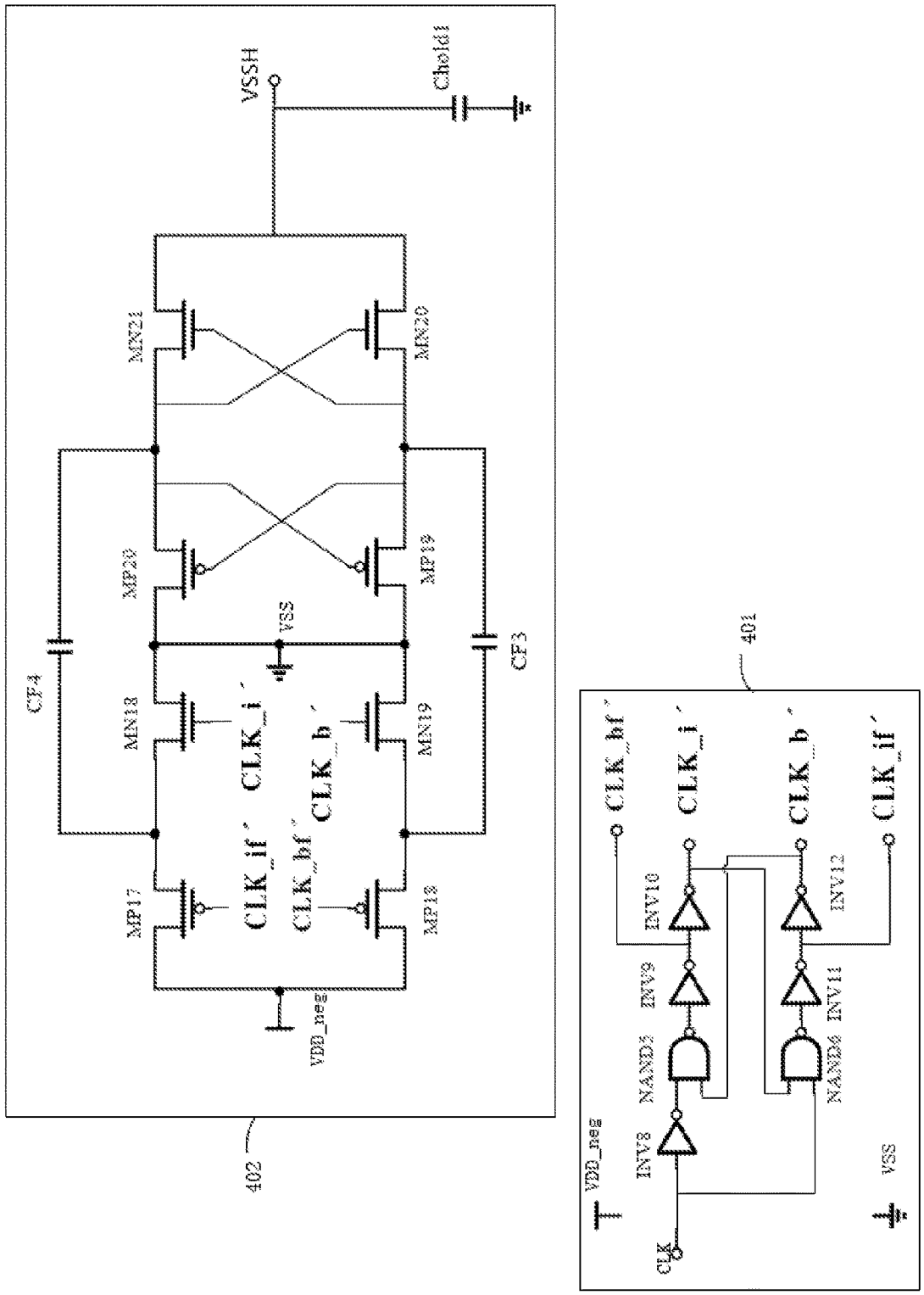
FIG. 4 is a circuit schematic diagram of a negative-voltage charge pump module in the positive-and-negative-voltage charge pump circuit according to the embodiment of the present disclosure.

The negative-voltage charge pump module 103 generates negative voltage output according to the clock signal generated by the clock generation module 100 and a clock swing voltage VDD_neg provided by the transient enhancement module 102. As shown in FIG. 4, the negative-voltage charge pump module 103 includes a second clock conversion unit 401 and a negative-voltage charge pump unit 402. An input end of the second clock conversion unit 401 is connected to the output end of the clock generation module 100. An output end of the second clock conversion unit 401 is connected to an input end of the negative-voltage charge pump unit 402. The input end of the negative-voltage charge pump unit 402 is connected to an output end of the voltage switching unit 302.

The second clock conversion unit 401 is configured to convert the clock signal outputted by the clock generation module 100 to generate two paths of complementary non-overlapping clock signals. As shown in FIG. 4, the second clock conversion unit 401 includes an eighth inverter INV8, a ninth inverter INV9, a tenth inverter INV10, an eleventh inverter INV11, a twelfth inverter INV 12, a fifth NAND gate NAND5 and a sixth NAND gate NAND6. An input end of the eighth inverter INV8 is connected to the output end of the clock generation module 100 and one input end of the sixth NAND gate NAND6. An output end of the eighth inverter INV8 is connected to one input end of the fifth NAND gate NAND5. An output end of the fifth NAND gate NAND5 is connected to an input end of the ninth inverter INV9. An output end of the ninth inverter INV9 is connected to a fifth output end and an input end of the tenth inverter INV10. An output end of the tenth inverter INV10 is connected to the other input end of the sixth NAND gate NAND6 and a sixth output end. An output end of the sixth NAND gate NAND6 is connected to an input end of the eleventh inverter INV11. An output end of the eleventh inverter INV11 is connected to an eighth output end and an input end of the twelfth inverter INV 12. An output end of the twelfth inverter INV 12 is connected to the other input end of the fifth NAND gate NAND5 and a seventh output end.

The second clock conversion unit 401 receives the clock signal CLK outputted by the clock generation module 100, and converts, by the inverters INV8-INV12 and the two input NAND gates NAND5 and NAND6, the clock signal CLK into two paths of non-overlapping clock signals: a first path of non-overlapping clock signals CLK_i' and CLK_b' and a second path of non-overlapping clock signals CLK_if' and CLK_bf'. A working voltage domain of the two input NAND gates NAND5 and NAND6 is between the output voltage VDD_neg of the voltage switching unit 302 and the ground voltage VSS. Converting, by the second clock conversion unit 401, the clock signal CLK
into the two paths of non-overlapping clock signals is an existing mature technology, which is not described herein in detail.

As shown in FIG. 4, the negative-voltage charge pump unit 402 includes an eighteenth PMOS tube MP17, a nineteenth PMOS tube MP18, a nineteenth NMOS tube MN18, a twentieth NMOS tube MN19, a twentieth PMOS tube MP19, a twenty-first PMOS tube MP20, a twenty-first NMOS tube MN20, a twenty-second NMOS tube MN21, a seventh capacitor CF3, an eighth capacitor CF4 and a ninth capacitor Chold1. A gate of the eighteenth PMOS tube MP17 is connected to an eighth output end of the second clock conversion unit 401. Drains of the eighteenth PMOS tube MP17 and the nineteenth PMOS tube MP18 are respectively connected to the output voltage VDD_neg of the voltage switching unit 302. A source of the eighteenth PMOS tube MP17 is respectively connected to one end of the eighth capacitor CF4 and a source of the nineteenth NMOS tube MN18. A gate of the nineteenth NMOS tube MN18 is connected to a sixth output end of the second clock conversion unit 401. A gate of the nineteenth PMOS tube MP18 is connected to a fifth output end of the second clock conversion unit 401. A source of the nineteenth PMOS tube MP18 is respectively connected to one end of the seventh capacitor CF3 and a source of the twentieth NMOS tube MN19. A gate of the twentieth NMOS tube MN19 is connected to a seventh output end of the second clock conversion unit 401. Drains of the nineteenth NMOS tube MN18, the twentieth NMOS tube MN19, the twentieth PMOS tube MP19 and the twenty-first PMOS tube MP20 are respectively grounded. A gate of the twenty-first PMOS tube MP20 is respectively connected to a source of the twentieth PMOS tube MP19, the other end of the seventh capacitor CF3, a gate of the twenty-second NMOS tube MN21 and a source of the twenty-first NMOS tube MN20. A gate of the twentieth PMOS tube MP19 is respectively connected to a source of the twenty-first PMOS tube MP20, the other end of the eighth capacitor CF4, a gate of the twenty-first NMOS tube MN20 and a source of the twenty-second NMOS tube MN21. Drains of the twenty-first NMOS tube MN20 and the twenty-second NMOS tube MN21 are both connected to the ninth capacitor Chold1 and a negative-voltage output end VSSH. The other end of the ninth capacitor Chold1 is grounded.

When the positive-and-negative-voltage charge pump circuit starts to work, the positive-voltage charge pump unit 202 and the negative-voltage charge pump unit 402 work at the same time. If the positive rail voltage within the voltage domain of the positive-and-negative-voltage charge pump circuit is the supply voltage VDD, and the negative rail voltage is the ground voltage VSS, the voltage generated by the positive-voltage charge pump unit 202 will be rapidly established to the target voltage. In this process, the transient enhancement module 102 samples the supply voltage VDD and the positive voltage outputted by the positive voltage output end VDDH of the positive-voltage charge pump unit 202. If the sampled positive voltage of the positive-voltage charge pump unit 202 does not reach the target value, the supply voltage VDD serves as the input voltage of the negative-voltage charge pump unit 402. When the non-overlapping clock signal CLK_i' is the high level, the non-overlapping clock signal CLK_b' is the low level. Meanwhile the levels of the non-overlapping clock signals CLK_if' and CLK_bf are the supply voltage VDD and the ground voltage VSS respectively. At the time, the eighteenth PMOS tube MP17 and the twentieth NMOS tube MN19 are in a conduction state, and the nineteenth NMOS tube MN18 and the nineteenth NMOS tube MN18 are in a cutoff state, such that the two ends of the seventh capacitor CF3 are respectively connected with the supply voltage VDD, thereby supplying the gate voltage being the ground voltage VS S-supply voltage VDD to the twenty-first PMOS tube MP20. The source voltage of the twenty-first PMOS tube MP20 is VDD, such that the twenty-first PMOS tube MP20 is in a conduction state. The gate voltage of the twenty-first NMOS tube MN20 is the supply voltage VDD, such that the twenty-first NMOS tube MN20 is in a conduction state. As a result, the charges in the seventh capacitor CF3 are all transmitted to the ninth capacitor Chold1 through the twenty-first NMOS tube MN20, that is, the ninth capacitor Chold1 is charged, thereby realizing negative voltage output. The negative voltage VSSH=VSS−VDD_neg, that is, when the positive voltage, sampled by the transient enhancement module 102, of the positive-voltage charge pump unit 202 does not reach the target value, the transient enhancement module 102 provides the voltage VDD_neg being the supply voltage VDD for the negative-voltage charge pump unit 402. Meanwhile the negative voltage VSSH generated by the negative-voltage charge pump unit 402 is the ground voltage VS S-supply voltage VDD. The twentieth PMOS tube MP19 and the twenty-second NMOS tube MN21 are in a cutoff state, one end of the eighth capacitor CF4 is connected with the supply voltage VDD, and the other end is connected with the ground voltage VSS, thereby charging the eighth capacitor CF4.

When the positive voltage of the positive-voltage charge pump unit 202 reaches the target value, the positive voltage of the positive-voltage charge pump unit 202 serves as the input voltage of the negative-voltage charge pump unit 402. At the time, the nineteenth PMOS tube MP18 and the nineteenth NMOS tube MN18 are controlled by the non-overlapping clock signals to be in a conduction state, the eighteenth PMOS tube MP17 and the twentieth NMOS tube MN19 are in a cutoff state, the twentieth PMOS tube MP9 and the twenty-second NMOS tube MN21 are in a conduction state, and the twenty-first PMOS tube MP20 and the twenty-first NMOS tube MN20 are in a cutoff state, such that the charges in the eighth capacitor CF4 are all transmitted to the ninth capacitor Chold1 through the twenty-second NMOS tube MN21, that is, the ninth capacitor Chold1 is charged, thereby realizing negative voltage output. The negative voltage VSSH=VSS−VDD_neg, that is, when the positive voltage, sampled by the transient enhancement module 102, of the positive-voltage charge pump unit 202 reaches the target value, the transient enhancement module 102 provides the voltage VDD_neg being the positive voltage of the positive-voltage charge pump unit 202 for the negative-voltage charge pump unit 402. Meanwhile the negative voltage VSSH generated by the negative-voltage charge pump unit 402 is the ground voltage VS S-positive voltage of the positive-voltage charge pump unit 202.

Thus, after the output voltage of the positive-voltage charge pump unit 202 is established, the negative-voltage charge pump unit 402 will extract the current from the positive-voltage charge pump unit 202, thereby finishing own negative voltage establishment. It can be known that the establishment time of the output voltage of the positive-voltage charge pump unit 202 is not influenced by work of the negative-voltage charge pump unit 402, meanwhile, in the positive voltage establishing process, the negative-voltage charge pump unit 402 has established the voltage being the ground voltage VSS-supply voltage VDD in advance, and after the output voltage of the positive-voltage charge pump unit 202 reaches a stable state, the voltage is utilized for generating the negative voltage, so as to accelerate the negative voltage establishing time of the negative-voltage charge pump unit 402.

It is to be emphasized that the non-overlapping clock signals CLK_if' and CLK_bf' respectively correspond to clock signals ahead the non-overlapping clock signals CLK_i' and CLK_b' by phases. In addition, the clock signal CLK_if' and the clock signal CLK_i' are in-phase, and the clock signals CLK_bf' and CLK_b' are same-phase clock signals. Through the non-overlapping clock signals CLK_if' and CLK_bf', the problem that the PMOS tubes and the NMOS tubes in the negative-voltage charge pump unit 402 are conducted at the same time can be solved.

In addition, the positive-and-negative-voltage charge pump circuit provided in the embodiment of the present disclosure may be used in an integrated circuit chip. A specific structure of the positive-and-negative-voltage charge pump circuit in the integrated circuit chip is not described herein in detail.

The above positive-and-negative-voltage charge pump circuit may also be used in a communication terminal to serve as an important component of an analog integrated circuit. The communication terminal described herein refers to a computer device used in a mobile environment and supporting a plurality of communication standards including GSM, EDGE, TD_SCDMA, TDD_LTE, FDD_LTE, etc., such as a mobile phone, a notebook computer, a tablet personal computer and an on-board computer. In addition, the technical solutions provided by the embodiments of the present disclosure are also applicable to other occasions where the analog integrated circuits are applied, such as a communication base station.

According to the positive-and-negative-voltage charge pump circuit provided by the embodiment of the present disclosure, the positive voltage is generated by the positive-voltage charge pump module, meanwhile, the positive voltage and the supply voltage are sampled by the transient enhancement module and converted into the currents for comparison, and the switchable input voltage is provided for the negative-voltage charge pump module according to the comparison result. The negative-voltage charge pump module can not only rapidly and reliably establish the negative voltage according to the clock signal outputted by the clock generation module so as to improve the speed and efficiency of generating the negative voltage by the negative-voltage charge pump module, but also flexibly satisfy different negative voltage requirements.

The positive-and-negative-voltage charge pump circuit, the chip and the communication terminal provided by the present disclosure are described in detail above. For those of ordinary skill in the art, any obvious modification made without departing from the essential contents of the present disclosure shall fall within the scope of protection of the patent right for the present disclosure.

What is claimed is:

1. A positive-and-negative-voltage charge pump circuit, comprising: a clock generation module, a positive-voltage charge pump module, a transient enhancement module and a negative-voltage charge pump module, wherein an output end of the clock generation module is connected to an input end of the positive-voltage charge pump module and an input end of the negative-voltage charge pump module, an output end of the positive-voltage charge pump module is connected to an input end of the transient enhancement module, an output end of the transient enhancement module is connected to an input power supply end of the negative-voltage charge pump module, and power supply ends of the clock generation module, the positive-voltage charge pump module and the transient enhancement module are all connected to a supply voltage; and the positive-voltage charge pump module generates a positive voltage according to a clock signal outputted by the clock generation module, the positive voltage and the supply voltage serve as input voltage sources to be sampled by the transient enhancement module and converted into currents for comparison, and a switchable input voltage is provided for the negative-voltage charge pump module according to a comparison result, such that the negative-voltage charge pump module generates a negative voltage according to the clock signal outputted by the clock generation module.

2. The positive-and-negative-voltage charge pump circuit according to claim 1, wherein
the positive-voltage charge pump module comprises a first clock conversion unit and at least one positive-voltage charge pump unit, an input end of the first clock conversion unit is connected to the output end of the clock generation module, and an output end of the first clock conversion unit is connected to an input end of each positive-voltage charge pump unit.

3. The positive-and-negative-voltage charge pump circuit according to claim 2, wherein
the first clock conversion unit comprises a first inverter, a second inverter, a third inverter, a fourth inverter, a fifth inverter, a first NAND gate and a second NAND gate; and an input end of the first inverter is connected to the output end of the clock generation module and one input end of the second NAND gate, an output end of the first inverter is connected to one input end of the first NAND gate, an output end of the first NAND gate is connected to an input end of the second inverter, an output end of the second inverter is connected to a first output end and an input end of the third inverter, an output end of the third inverter is connected to the other input end of the second NAND gate and a second output end, an output end of the second NAND gate is connected to an input end of the fourth inverter, an output end of the fourth inverter is connected to a fourth output end and an input end of the fifth inverter, and an output end of the fifth inverter is connected to the other input end of the first NAND gate and a third output end.

4. The positive-and-negative-voltage charge pump circuit according to claim 2, wherein
in a case that a plurality of positive-voltage charge pump units are adopted, starting from the second positive-voltage charge pump unit, an input voltage of each positive-voltage charge pump unit is connected to a positive voltage output end of the previous positive-voltage charge pump unit.

5. The positive-and-negative-voltage charge pump circuit according to claim 4, wherein
the positive-voltage charge pump unit comprises a first NMOS tube, a second NMOS tube, a first PMOS tube, a second PMOS tube, a third NMOS tube, a fourth NMOS tube, a third PMOS tube, a fourth PMOS tube, a first capacitor, a second capacitor and a third capacitor; a gate of the first NMOS tube is connected to a fourth output end of the first clock conversion unit, sources of the first NMOS tube and the second NMOS tube are respectively grounded, a drain of the first NMOS tube is respectively connected to one end of the second capacitor and a drain of the first PMOS tube, a gate of the first PMOS tube is connected to a second output end of the first clock conversion unit, and a gate of the second NMOS tube is connected to a first output end of the first clock conversion unit; and a drain of the second NMOS tube is respectively connected to one end of the first capacitor and a drain of the second PMOS tube, a gate of the second PMOS tube is connected to a third output end of the first clock conversion unit, sources of the second PMOS tube, the first PMOS tube, the third NMOS tube and the fourth NMOS tube are connected with an input voltage, a gate of the fourth NMOS tube is respectively connected to a drain of the third NMOS tube, the other end of the first capacitor, a gate of the fourth PMOS tube and a drain of the third PMOS tube, a gate of the third NMOS tube is respectively connected to a drain of the fourth NMOS tube, the other end of the second capacitor, a gate of the third PMOS tube and a drain of the fourth PMOS tube, sources of the third PMOS tube and the fourth PMOS tube are respectively connected to one end of the third capacitor and the positive voltage output end, and the other end of the third capacitor is grounded.

6. The positive-and-negative-voltage charge pump circuit according to claim 5, wherein
the transient enhancement module comprises a voltage sampling comparison unit and a voltage switching unit, an input end of the voltage sampling comparison unit is connected to the positive voltage output end of the positive-voltage charge pump unit and the supply voltage, and an output end of the voltage sampling comparison unit is connected to an input end of the voltage switching unit.

7. The positive-and-negative-voltage charge pump circuit according to claim 6, wherein
the voltage sampling comparison unit comprises a first resistor, a fifth NMOS tube, a sixth NMOS tube, a seventh NMOS tube, an eighth NMOS tube, a fifth PMOS tube, a sixth PMOS tube, a second resistor, a third resistor and a fourth capacitor; one end of the first resistor and sources of the fifth PMOS tube and the sixth PMOS tube are respectively connected to the supply voltage, and the other end of the first resistor is respectively connected to a drain and a gate of the fifth NMOS tube and a gate of the sixth NMOS tube; a drain of the sixth NMOS tube is respectively connected to a drain and a gate of the fifth PMOS tube and a gate of the sixth PMOS tube; a drain of the sixth PMOS tube is respectively connected to one end of the fourth capacitor, one end of the third resistor, a drain of the seventh NMOS tube and the voltage switching unit; a gate of the seventh NMOS tube is respectively connected to a gate and a drain of the eighth NMOS tube and one end of the second resistor, and the other end of the second resistor is connected to the positive voltage output end of the positive-voltage charge pump unit; and sources of the eighth NMOS tube and the seventh NMOS tube, the other end of the third resistor, the other end of the fourth capacitor, and sources of the sixth NMOS tube and the fifth NMOS tube are all grounded.

8. The positive-and-negative-voltage charge pump circuit according to claim 6, wherein
the voltage switching unit comprises a hysteresis inverter, a logic level conversion subunit and a switching subunit; and an input end of the hysteresis inverter is connected to the output end of the voltage sampling comparison unit, an output end of the hysteresis inverter is connected to an input end of the logic level conversion subunit, and an output end of the logic level conversion subunit is connected to an input end of the switching subunit.

9. The positive-and-negative-voltage charge pump circuit according to claim 8, wherein
the logic level conversion subunit comprises a sixth inverter, a seventh inverter, a twelfth NMOS tube, a thirteenth NMOS tube, a fourteenth NMOS tube, a fifteenth NMOS tube, a sixteenth NMOS tube, a seventeenth NMOS tube, an eighteenth NMOS tube, a tenth PMOS tube, an eleventh PMOS tube, a twelfth PMOS tube, a thirteenth PMOS tube, a fourteenth PMOS tube, a fifteenth PMOS tube, a fifth capacitor, a sixth capacitor, a third NAND gate, a fourth NAND gate, an XOR gate and a plurality of digital delay units; an input end of the sixth inverter is connected to the output end of the hysteresis inverter, an output end of the sixth inverter is connected to an input end of the seventh inverter and a gate of the thirteenth NMOS tube, and an output end of the seventh inverter is connected to one input end of the switching subunit and a gate of the fourteenth NMOS tube; a Node X is respectively connected to the output end of the hysteresis inverter, an input end of the first digital delay unit and one input end of the XOR gate, the plurality of digital delay units are connected between an output end of the first digital delay unit and an input end of the last digital delay unit in series, an output end of the last digital delay unit is connected to the other input end of the XOR gate, an output end of the XOR gate is respectively connected to gates of the eighteenth NMOS tube and the seventeenth NMOS tube and gates of the fourteenth PMOS tube and the fifteenth PMOS tube, a drain of the fifteenth PMOS tube is connected to one end of the sixth capacitor and a drain of the eighteenth NMOS tube, a source of the eighteenth NMOS tube is connected to a drain of the fourteenth NMOS tube, and the other end of the sixth capacitor is connected to a source of the fifteenth NMOS tube, one input end of the third NAND gate and a drain of the tenth PMOS tube; a drain of the fifteenth NMOS tube is connected to a drain of the sixteenth NMOS tube, a source of the sixteenth NMOS tube is connected to a drain of the eleventh PMOS tube, one end of the fifth capacitor and one input end of the fourth NAND gate, the other end of the fifth capacitor is respectively connected to a drain of the fourteenth PMOS tube and a drain of the seventeenth NMOS tube, a source of the seventeenth NMOS tube is connected to a drain of the thirteenth NMOS tube, a gate of the twelfth NMOS tube is connected to a drain of the fifth NMOS tube, a drain of the twelfth NMOS tube is respectively connected to a drain and a gate of the thirteenth PMOS tube and gates of the sixteenth NMOS tube and the fifteenth NMOS tube; and a source of the thirteenth PMOS tube is respectively connected to a drain and a gate of the twelfth PMOS tube and gates of the eleventh PMOS tube and the tenth PMOS tube, sources of the twelfth PMOS tube, the eleventh PMOS tube and the tenth PMOS tube and the drains of the fifteenth NMOS tube and the sixteenth NMOS tube are all connected to the positive voltage output end of the positive-voltage charge pump unit, sources of the fourteenth NMOS tube, the thirteenth NMOS tube and the twelfth NMOS tube are respectively grounded, sources of the fourteenth PMOS tube and the fifteenth PMOS tube are respectively connected to a negative rail voltage of a located voltage domain, the other input end of the third NAND gate is connected to an output end of the fourth NAND gate and the other input end of the switching subunit, and an output end of the third NAND gate is connected to the other input end of the fourth NAND gate.

10. The positive-and-negative-voltage charge pump circuit according to claim 9, wherein
the switching subunit comprises a sixteenth PMOS tube and a seventeenth PMOS tube, a gate of the sixteenth PMOS tube is connected to the output end of the fourth NAND gate, a source of the sixteenth PMOS tube is connected to the positive voltage output end of the positive-voltage charge pump unit, a gate of the seventeenth PMOS tube is connected to the output end of the seventh inverter, a source of the seventeenth PMOS tube is connected to the supply voltage, and drains of the seventeenth PMOS tube and the sixteenth PMOS tube serve as output ends of the switching subunit.

11. The positive-and-negative-voltage charge pump circuit according to claim 10, wherein
the negative-voltage charge pump module comprises a second clock conversion unit and a negative-voltage charge pump unit, an input end of the second clock conversion unit is connected to the output end of the clock generation module, an output end of the second clock conversion unit is connected to an input end of the negative-voltage charge pump unit, and the input end of the negative-voltage charge pump unit is connected to an output end of the voltage switching unit.

12. The positive-and-negative-voltage charge pump circuit according to claim 11, wherein
the second clock conversion unit comprises an eighth inverter, a ninth inverter, a tenth inverter, an eleventh inverter, a twelfth inverter, a fifth NAND gate and a sixth NAND gate; and an input end of the eighth inverter is connected to the output end of the clock generation module and one input end of the sixth NAND gate, an output end of the eighth inverter is connected to one input end of the fifth NAND gate, an output end of the fifth NAND gate is connected to an input end of the ninth inverter, an output end of the ninth inverter is connected to a fifth output end and an input end of the tenth inverter, an output end of the tenth inverter is connected to the other input end of the sixth NAND gate and a sixth output end, an output end of the sixth NAND gate is connected to an input end of the eleventh inverter, an output end of the eleventh inverter is connected to an eighth output end and an input end of the twelfth inverter, and an output end of the twelfth inverter is connected to the other input end of the fifth NAND gate and a seventh output end.

13. The positive-and-negative-voltage charge pump circuit according to claim 12, wherein
the negative-voltage charge pump unit comprises an eighteenth PMOS tube, a nineteenth PMOS tube, a nineteenth NMOS tube, a twentieth NMOS tube, a twentieth PMOS tube, a twenty-first PMOS tube, a twenty-first NMOS tube, a twenty-second NMOS tube, a seventh capacitor, an eighth capacitor and a ninth capacitor; a gate of the eighteenth PMOS tube is connected to an eighth output end of the second clock conversion unit, drains of the eighteenth PMOS tube and the nineteenth PMOS tube are respectively connected to the output voltage of the voltage switching unit, a source of the eighteenth PMOS tube is respectively connected to one end of the eighth capacitor and a source of the nineteenth NMOS tube, a gate of the nineteenth NMOS tube is connected to a sixth output end of the second clock conversion unit, and a gate of the nineteenth PMOS tube is connected to a fifth output end of the second clock conversion unit; a source of the nineteenth PMOS tube is respectively connected to one end of the seventh capacitor and a source of the twentieth NMOS tube, a gate of the twentieth NMOS tube is connected to a seventh output end of the second clock conversion unit, and drains of the nineteenth NMOS tube, the twentieth NMOS tube, the twentieth PMOS tube and the twenty-first PMOS tube are respectively grounded; and a gate of the twenty-first PMOS tube is respectively connected to a source of the twentieth PMOS tube, the other end of the seventh capacitor, a gate of the twenty-second NMOS tube and a source of the twenty-first NMOS tube, a gate of the twentieth PMOS tube is respectively connected to a source of the twenty-first PMOS tube, the other end of the eighth capacitor, a gate of the twenty-first NMOS tube and a source of the twenty-second NMOS tube, drains of the twenty-first NMOS tube and the twenty-second NMOS tube are respectively connected to one end of the ninth capacitor and a negative-voltage output end, and the other end of the ninth capacitor is grounded.

14. An integrated circuit chip, comprising the positive-and-negative-voltage charge pump circuit according to claim 1.

15. A communication terminal, comprising the positive-and-negative-voltage charge pump circuit according to claim 1.

* * * * *